United States Patent [19]

Blum

[11] 4,005,351
[45] Jan. 25, 1977

[54] VOLTAGE-REGULATED AND OVERCURRENT-PROTECTED POWER SUPPLY

[75] Inventor: Rudolf Blum, Wendlingen, Germany
[73] Assignee: Robert Bosch G.m.b.H., Stuttgart, Germany
[22] Filed: Oct. 9, 1975
[21] Appl. No.: 621,001

[30] Foreign Application Priority Data

Dec. 6, 1974  Germany .................. 2457664

[52] U.S. Cl. ...................... 321/14; 321/2; 321/19; 323/9
[51] Int. Cl.$^2$ ...................... H02M 3/335
[58] Field of Search ............... 321/2, 14, 19, 44; 323/9, 22 T; 331/112

[56] References Cited
UNITED STATES PATENTS

| | | | |
|---|---|---|---|
| 2,920,265 | 1/1960 | Siedband | 323/22 T |
| 2,941,159 | 6/1960 | Edelman | 321/2 X |
| 3,300,705 | 1/1967 | Hunstad | 321/2 |
| 3,435,320 | 3/1969 | Lee et al. | 331/112 X |
| 3,441,833 | 4/1969 | Bahrs et al. | 323/9 |
| 3,639,826 | 2/1972 | Grundberg | 321/2 |
| 3,668,505 | 6/1972 | Dalton et al. | 331/112 X |
| 3,684,924 | 8/1972 | Miller | 323/9 X |
| 3,889,173 | 6/1975 | Klusmann et al. | 331/112 X |

Primary Examiner—A. D. Pellinen
Attorney, Agent, or Firm—Flynn & Frishauf

[57] ABSTRACT

To provide output power, for example for automotive test equipment from input sources having widely varying input voltages, for example between 4.5 and 32 V, without range switches, or setting potentiometers, a blocking oscillator circuit including a transformer and a switching transistor in series with the primary are connected across the input terminals, one secondary of the transformer charging a capacitor, another secondary of the transformer charging an auxiliary capacitor, the output voltage of which is connected to a control transistor to interrupt operation of the blocking oscillator formed by the transformer primary and the transistor when the voltage applied to the control transistor control electrode exceeds a reference value established, for example, by a Zener diode; a sensing resistor is connected in series with the main switching transistor, across which an output voltage is taken which is in turn applied to the control electrode of the control transistor to interrupt blocking oscillator operation of the main transistor when the current through the sensing resistor exceeds a predetermined value.

6 Claims, 2 Drawing Figures

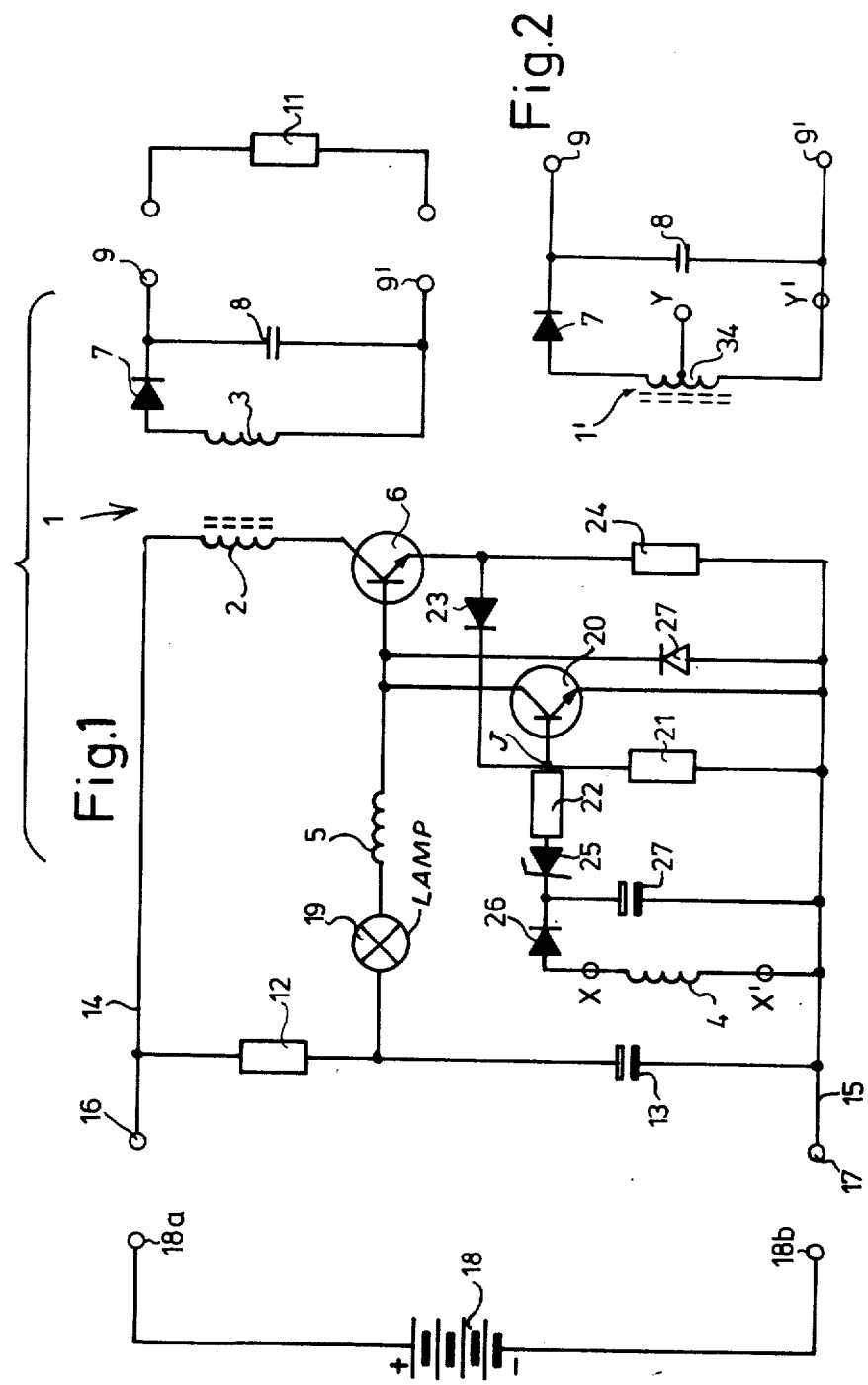

VOLTAGE-REGULATED AND OVERCURRENT-PROTECTED POWER SUPPLY

The present invention relates to a voltage-regulated and overcurrent-protected power supply circuit, particularly for energization by a power source of widely varying supply voltage, and especially for vehicular, for example automotive application.

Voltage supplies for various types of automotive engine test equipment, such as motor testers, tune-up sets, timing lights, and the like, are widely used to test operation and performance of vehicular, especially automotive internal combustion engines. The current supply for the test equipment is taken from the vehicular battery. The test equipment itself frequently requires a stable operating voltage. Since the test equipment may be used with vehicles of widely varying on-board battery voltages, and there with batteries of unknown and frequently varying quality, it is necessary to provide a supply voltage which is stable although the input voltage may vary between 4.5 V and 32 V, that is, a range of well over 700% and greatly in excess of the usual variation range of supply voltages of stabilized voltage supply units.

It is an object of the present invention to provide a voltage-regulated yet overcurrent-protected power supply which provides a stable output voltage regardless of the input voltage applied thereto, that is, an output voltage which will have a nominal value even though the input voltage may vary in the range of, for example, from 4.5 V to 32 V, that is, a variation of well over 700%. The voltage-regulated power supply should, additionally, be simple, inexpensive and rugged in its construction and should be so arranged that, preferably, it can be directly connected to any supply source within its given range without requiring additional switchover by the operator to match the power supply input to at least a nominal supply value.

SUBJECT MATTER OF THE PRESENT INVENTION

Briefly, a blocking oscillator is provided including a transformer and a main switching transistor, the primary of the transformer being connected into the output circuit of the switching transistor. A control transistor has its output circuit connected to the blocking oscillator to control the conduction state of the switching transistor, a control circuit being provided which, in turn, controls the conduction of the control transistor, the control transistor sensing output voltage of the power supply as well as current flow through the switching transistor to control the operation of the control transistor in accordance with the sensed output voltage and current flow to limit the oscillatory operation of the blocking oscillator when either of the sensed values deviates from a value established by a reference, for example a Zener diode.

The invention will be described by way of example with reference to the accompanying drawings, wherein:

FIG. 1 is a general schematic circuit diagram of the voltage regulator; and

FIG. 2 is a fragmentary diagram of the regulator of FIG. 1, illustrating a modification.

A transformer 1 (FIG. 1) has a primary winding 2 and three secondary windings 3, 4, 5. The second secondary winding 4 may be formed as a tap on the first secondary winding 3, as will be explained in connection with FIG. 2. The primary 2 of the transformer 1 is connected into the main switching circuit, that is, the emitter-collector circuit of a switching transistor 6. Conduction of switching transistor 6 permits current to flow through the primary, or interrupts the current. The state of switching transistor 6 is controlled from the third secondary winding 5 of the transformer. When the current flow through the primary 2 of transformer 1 is broken, the energy stored in the primary 2 is transferred to the first secondary winding 3 which is connected over a rectifier 7 to a capacitor 8. The d-c voltage which appears across the rectifier 7 slowly charges the capacitor 8 to its full charge voltage. The output terminals 9, 9' are connected across capacitor 8. A load can then be connected to output terminals 9, 9', the load being schematically illustrated at 11 which may, for example, be a timing light, a tuning tester, or the like.

The transformer 1, together with the transistor 6, forms a blocking oscillator. To cause the blocking oscillator to start oscillating, the third secondary winding 5 of transformer 1 is connected to the tap point of a voltage divider formed of a resistor 12 and a capacitor 13 and connected across the operating buses 14, 15 of the circuit. The supply line 14 is connected to input terminal 16; supply line 15 is connected to input terminal 17. The input terminals can be connected to a source of d-c voltage, for example a battery 18, polarized as shown, and having output terminals 18a, 18b. The supply bus 14 of the equipment is the positive supply, and terminals 16, 18a and 17, 18b are arranged for connection as schematically illustrated in FIG. 1. The control current for switching transistor 6 should be held within limits, and particularly be approximately constant as the input voltage changes. In order to maintain the base current substantially constant, with change in input voltage, a cold conductor resistor i.e. one whose resistance increases with increasing temperature is included in series with the third secondary winding 5. This cold-conductor resistor preferably is an incandescent lamp. Using an incandescent lamp is a particularly inexpensive solution and is a preferred embodiment.

The control electrode of the switching transistor 6 is connected to the collector of a control transistor 20, the emitter of which is connected to the ground or chassis bus 15. The base of the control transistor 20 is connected to a junction J. Junction J has connected to it, besides the base of the control transistor 20, one terminal of a resistor 21, the other terminal of which connects to the chassis or ground bus 15; one terminal of a resistor 22, the other terminal of which is connected to the anode of a Zener diode 25; and to the cathode of a diode 23, the other terminal of which is connected to the emitter of the switching transistor 6. The emitter of switching transistor 6, and hence the anode of diode 23 is connected through a sensing resistor 24 to chassis bus 15. The cathode of Zener diode 25 is connected to the cathode of a diode 26 as well as to one electrode of an auxiliary capacitor 27, the other electrode of which is grounded to chassis bus 15. The anode of diode 26 is connected to the second secondary winding 4 of transformer 1, the other terminal of which is grounded. The control electrode of switching transistor 6 is additionally connected to a diode 27 which has its anode connected to ground bus 15. The diode 27 prevents negative voltages from being applied to the base of the switching transistor 6 and to capacitor 13.

Operation: Under ordinary operating conditions, transformer 1 starts to oscillate due to intermittent cyclical changing of the state of transistor 6 between conductive and blocked state. These changes can continue, however, only if the control transistor 20 is blocked, that is, is in high resistance state. The blocking oscillator immediately stops oscillating when control transistor 20 becomes conductive, since then, effectively, the voltage of supply line 15 is applied to the control electrode of switching transistor 6.

There are two conditions which may cause control transistor 20 to become conductive: (1) The output voltage across terminals 9, 9' reaches a predetermined value; (2) the primary current flowing through primary winding 2 and the emitter-collector path of switching transistor 6, and hence through sensing resistor 24, reaches a predetermined value.

The output voltage control is obtained by measuring the voltage induced in the secondaries of the transformer 1, and in particular in the second secondary winding 4 of the transformer 1. The auxiliary capacitor 27 will be charged from the second secondary winding 4 in the same manner as the main capacitor is being charged from the first or main secondary winding 3. An inspection will reveal that the circuit of winding 3, diode 7 and capacitor 8 is duplicated by the circuit of winding 4, diode 26 and capacitor 27. The Zener diode 25 then provides a reference and below the voltage determined by the Zener diode, charge on the auxiliary capacitor 20 is irrelevant. If, however, the charge across the auxiliary capacitor 27 causes Zener diode 25 to become conductive, that is, exceeds the reference voltage determined by the Zener diode, then control transistor 20 will receive a positive signal at its base, thus causing control transistor 20 to switch into conductive state and immediately interrupting oscillation of the blocking oscillator. This also terminates charging of capacitor 8.

Connecting a load 11 to output terminals 9, 9' discharges the capacitor 8; this load may, for example, be caused by flashing of a timing light. The voltage across capacitor 27 follows the voltage across capacitor 8, and discharge of capacitor 27 is effected over the discharge circuit formed by the Zener diode 25 and resistor 22, junction J and resistor 21. As voltage rises across capacitor 8, the voltage across the auxiliary capacitor 27 will likewise rise and the cycle will repeat. Thus, voltage across capacitor 8 is limited to a maximum value, independently of the voltage applied to the input terminals 16, 17 from battery 18.

Current control is effected by sensing voltage drop across resistor 24. Depending on the current flowing through the emitter-collector path of switching transistor 6, a voltage will arise across sensing or measuring resistor 24, which, when the current reaches a predetermined value, will cause a voltage to appear at the junction of the sensing resistor 24 and the transistor 6 and diode 23. When this voltage exceeds the control voltage necessary to cause transistor 20 to switch into conductive state, then the base control voltage to switching transistor 6 again in short-circuited to bus 15, due to conduction of transistor 20, and switching transistor 6 will block. The voltage reflected back through diode 23 will then drop and control transistor 20 will block. After the blocking phase, switching transistor 6 will again change into its conductive stage, and current can again flow up to its predetermined maximum value. Thus, due to the current control, the switching transistor 6 may have any desired current amplification, yet it cannot be overloaded and destruction of the circuit is not possible.

It is a specific advantage of the circuit that control of current flow as well as control of output voltage is obtained by a common control element and circuit, which includes as active element transistor 20. Thus, the arrangement is particularly simple, inexpensive, and reliable. No range changing points or switches are necessary, and there are no potentiometers to provide for adjustments, so that the circuit is additionally simplified and sources of error and trouble are eliminated. The operating reliability of the circuit is thus improved.

It is an additional advantage that the battery output terminals 18a, 18b, and the input terminals to the equipment 16, 17 are galvanically separated from the output terminals 9, 9', that is, that there is no common ground connection.

If the feature of galvanic separation of the output circuit from the input circuit is not important, then the circuit can be further simplified as illustrated in connection with FIG. 2. If the circuit of FIG. 1 is broken at points X, X', then the second secondary winding 4 can be replaced by a tap on a secondary 34. Thus, transformer 1' will only require a primary winding 2, the secondary 34, and the secondary winding 5. Terminals Y, Y' (FIG. 2) can then be connected into the circuit of FIG. 1 at terminals X, X', thus eliminating a separate secondary winding. The power requirements of the winding 4 are, of course, very low so that the wire size of winding 34 need not take special consideration of the requirements of the control circuit, and can be matched entirely to the design load to be delivered at terminals 9, 9'. This simplification further decreases costs; the galvanic separation is, however, lost.

Various changes and modifications may be made within the scope of the inventive concept.

I claim:

1. Voltage-regulated and overcurrent-protected power supply for energization by a power source of widely varying voltage comprising
 a blocking oscillator circuit including a transformer (1) and a switching transistor (6), the primary (2) of the transformer being connected into the output circuit of the switching transistor (6);
 an output circuit including a first secondary winding (3, 34) of the transformer, a rectifier (7) connected in series with one terminal of the first secondary winding a main capacitor (8) connected across the other terminal of the first secondary winding (3) and the free terminal of the rectifier (7) and output terminals (9, 9') connected across the main capacitor (8);
 a single control transistor (20) having its output circuit connected to the blocking oscillator to control the conduction state of the switching transistor (6);
 and two control branch circuits (4, 27, 25; 23, 24) connected to control conduction of the control transistor (20), said control branch circuits being connected to a common control junction (J) connected to control the control transistor (20), wherein
 the voltage sensing branch (4, 26, 27) includes a second secondary transformer winding (4, Y) a rectifier (26) and an auxiliary capacitor (27) connected in a circuit configuration similar to the circuit configuration of the output circuit, a reference element (25) and means (22, 21) applying the output from said voltage sensing branch circuit to the common control junction (J) of the control transistor (20) when the output voltage rises above the reference voltage as determined by said reference element to control the control transistor (20) to in turn control the main switching resistor (6) to blocked state; and wherein the second branch comprises a sensing resistor (24) connected in series with the main switching path of the main switching transistor (6) and a coupling circuit (23) connecting a sensing voltage across the sensing resistor (24) and representative of current flow to the common control junction (J) of the control transistor (20).

2. Power supply according to claim 1, wherein the reference element (25) is connected to the common control junction (J) and hence to the control electrode of the control transistor (20).

3. Power supply according to claim 1, further comprising a discharge circuit including a discharge resistor (21) connected to the auxiliary capacitor (27), the reference element (25) being included in the discharge circuit.

4. Power supply according to claim 1, wherein the coupling circuit comprises a diode (23).

5. Power supply according to claim 1, further comprising a third secondary winding (5) connected to the control electrode of the main switching transistor (6);

a cold conductor resistance (19) connected in series with the third secondary winding;

and a voltage divider comprising a resistor (12) and a capacitor (13) connected across the input terminals of the power supply, the series circuit comprising the cold conductor and the third secondary winding (5) of the transformer (1) being connected to the tap point of the voltage divider.

6. Power supply according to claim 1, wherein the second secondary winding of the transformer (1') is formed by an tap (Y) on the first secondary winding (34).

* * * * *